United States Patent Office 2,891,939
Patented June 23, 1959

2,891,939

CHROMIUM-CONTAINING MONOAZO DYESTUFFS

Guido Schetty, Basel, Switzerland, assignor to J. R. Geigy A.-G., Basel, Switzerland No Drawing. Application March 17, 1958
Serial No. 721,634

Claims priority, application Switzerland March 29, 1957

7 Claims. (Cl. 260—145)

The present invention concerns a process for the production of chromium-containing monoazo dyestuffs as well as their use for the dyeing and printing of organic material. At the same time, it embraces the new dyestuffs obtained according to this process and, as industrial product, the materials dyed and printed with these dyestuffs.

Complex heavy metal compounds of monoazo dyestuffs having no carboxylic acid and sulphonic acid groups and which contain 1-acylamino-7-hydroxynaphthalene compounds as azo components have already been described. They have been suggested for the dyeing of lakes, synthetic resins and similar substances. They are not suitable for the dyeing of animal fibres such as wool from an aqueous bath unless they contain certain non-ionogenic groups which increase the water solubility. Up to now for example alkyl sulphone and sulphonic acid amide groups have been used in complex chromium and cobalt compounds, advantageously in the diazo component, as such non-ionogenic groups.

It has now been found that particularly fast to light chromium-containing dyestuffs in which one chromium atom is bound in complex linkage to two monoazo dyestuff molecules are obtained if agents giving off chromium are reacted with dyestuffs of the general formula:

wherein:

A represents a benzene radical bound to the azo group in o-position to the hydroxyl group, which contains at least one non-ionogenic substituent not containing sulphur, and B represents a 1-acylamino-7-hydroxynaphthalene radical containing no ionogenic groups, bound in 8-position to the azo group, in which the acyl group is the radical of a carboxylic acid of the benzene series, the components being so chosen that there is an acylated primary amino group in the acyl radical of the azo component in at least one of the two monoazo dyestuffs.

As defined the two dyestuffs bound to the same chromium atom can be identical or different, but it is a condition that at least one of the two should contain an acylated primary amino group in the acyl radical of the azo component as the solubility promoting property of this acylated primary amino group is particularly marked if it contains the radical of a low molecular organic acid, in particular that of a low aliphatic monocarboxylic acid or monosulphonic acid. In this connection the acetylamino and methyl sulphonic acid amino groups are particularly suitable. Depending on the substitution of the diazo components however, valuable products are also found in the dyestuffs containing chloromethyl sulphonic acid amino, ethane sulphonic acid amino, carbomethoxyamino, chloroacetylamino and propionylamino radicals. Dyestuffs in which the acyl radicals are derived from high molecular acids have too little water solubility to be dyed from an aqueous bath. They are, however, valuable lacquer dye-stuffs. The acylamino groups of the acyl radicals according to the definition are advantageously in the m- or p-position to the benzene ring with regard to the carbonyl group. Within the definition, the benzoyl groups can contain further non-ionogenic substituents, for example halogen atoms, alkyl, alkoxy and nitro groups.

By 1-acylamino-7-hydroxynaphthalenes the benzoylamino-7-hydroxynaphthalenes are meant in the process according to the present invention. They may possibly also contain non-ionogenic substituents in the benzene and naphthalene nuclei. Examples of such 1-acylamino-7-hydroxynaphthalenes which also contain an acylated primary amino group in the benzoyl radical are: 2'-, 3'- or 4'-acetylamino-benzoyl-1-amino-7-hydroxynaphthalene, 3'-chloracetylamino-, 3'-propionylamino-, 3'-methoxyacetylaminobenzoyl-1-amino-7 - hydroxynaphthalene, 3'-carbomethoxyaminobenzoyl-1-amino-7 - hydroxynaphthalene, 2'-, 3'- or 4'-methyl sulphonylamino-benzoyl-1-amino-7 - hydroxynaphthalene, 3' - chloromethane sulphonylamino-benzoyl-1-amino-7 - hydroxynaphthalene, 4'-methyl- or 4'-chloro- 3'-acetylamino- or -methyl sulphonylamino-benzoyl-1-amino-7-hydroxynaphthalene and 4'-hydroxy-3'-acetylamino-benzoyl-1-amino - 7 - hydroxynaphthalene.

These compounds are obtained by reacting 1-amino-7-hydroxy-naphthalene with nitrated carboxylic acid chlorides of the benzene series in an aqueous or organic medium, e.g. pyridine, reducing to the 1-aminophenyl carbonyl-7-hydroxynaphthalenes and acylating these with alkyl sulphonic acid or alkyl carboxylic acid halides. Any acyloxy groups which may also have been formed should be saponified under mild conditions for example with alkali carbonates.

o-Amino-hydroxybenzene compounds containing at least one non-ionogenic substituent containing no sulphur in the benzene nucleus according to the present invention can be used as diazo components. In particular halogen atoms and nitro groups are used as substituents. Particular valuable dyestuffs are obtained with those 2-amino-1-hydroxybenzene compounds which contain a nitro group in the 4-position. Naturally also those amino compounds not containing sulphonyl and carboxyl groups which exchange a substituent in the 2-position for a hydroxyl-group bound to the chromium atom can be used as diazo components. Diazo components which can be used according to the present invention are for example:

5- or 6-nitro-2-amino-1-hydroxybenzene, 4.6-dinitro-2-amino-1-hydroxybenzene, 4- or 5-chloro-2-amino-1-hydroxybenzene, 4.6-dichloro-2-amino - 1 - hydroxybenzene, 3.4.6-trichloro-2-amino-1-hydroxybenzene, 4-methyl- or 4-tert. amyl-6-nitro-2-amino-1-hydroxybenzene, 4-methyl- or -chloro-5-nitro-2-amino-1-hydroxybenzene, 4-nitro-6-chloro-2-amino-1-hydroxybenzene and 4-chloro-6-nitro-2-amino-1-hydroxybenzene, 4-cyano-2-amino-1 - hydroxybenzene, 2-amino-1-hydroxybenzene-4-methyl ketone, 2-amino-1-hydroxybenzene-4-phenyl ketone and 2-amino-1-hydroxybenzene-4-carboxylic acid dimethyl amide, in particular however, 4-nitro-2-amino-1-hydroxybenzene.

The diazotisation of such o-aminohydroxybenzene compounds is known per se and the coupling with the azo components which can be used according to the present invention is also performed according to the usual methods, i.e. in alkaline medium and possibly in the presence of tertiary nitrogen bases such as pyridine, lutidine, collidine, triethanolamine, dimethyl aniline or dimethyl formamide which accelerate the coupling reaction.

The complex chromium compounds are produced by treating the monoazo dyestuffs used according to the present invention with agents giving off chromium. The methods used for this are known. Both inorganic and organic salts of chromium as well as complex compounds of this metal are used as agents giving off chromium. With salts of hexavalent chromium the presence of a suitable reducing agent is necessary, for example a reducing sugar. The choice of chroming agent depends chiefly on the conditions under which the metallisation is performed. On chroming in an alkaline medium it is advantageous to use the alkali stable complex compounds such as the alkali metal salts of chromosalicylic acids. Naturally, the choice is also influenced by economic factors. The metallisation is performed advantageously in aqueous medium but it can also be performed if necessary in aqueous-organic or in organic medium alone or in the melt of salts of low molecular fatty acids. The chroming is performed advantageously in the warm and in a weakly acid to alkaline medium, somewhat more than a half molecule of chromic salt or more than a half equivalent of a complex chromium compound being reacted with one dyestuff molecule. In the dyestuffs so obtained of the type (monoazo dyestuff-chromium-monoazo dyestuff)

two identical or different monoazo dyestuffs are bound to the chromium atom. The former are compounds which contain an acylated primary amino group in each acyl radical of the azo component and thus most of them have also good water solubility. According to the definition, dyestuffs of the second type can contain such a solubility promoting substituent only in one acyl radical of the azo components. When combining two different monoazo dyestuffs, a suitable choice enables not only the obtention of various shades but also the drawing power and, within certain limits, the water solubility can be influenced in the desired direction. To produce such "mixed chromium complexes," the mixture of the two dyestuffs is chromed under the conditions which have already been described. A preferred method for the production of mixed chromium complex dyestuffs according to the present invention consists in coupling one mol of a diazo component with half a mol of each of two different azo components and then chroming the dyestuff mixture. Apart from the "mixed chroming" however, it is also possible first to chrome one of the two monoazo dyestuffs, the conditions being so chosen that one dyestuff molecule contains one chromium atom bound in complex linkage and then to react one mole of this 1:1 chromium complex with one mol of the other, metal-free dyestuff. 1:1 Chromium complexes are obtained according to experience from the metal-free monoazo dyestuffs in an acid, aqueous-organic medium with an excess of a salt of trivalent chromium, for example with chromic formiate, chromic acetate or chromic fluoride, at a raised temperature. The reaction of the 1:1 complex with the second metal-free dyestuff is performed advantageously in aqueous, neutral to alkaline medium at the usual or raised temperature. This "mixed metallisation" by way of the 1:1 complex is rather more complicated but it enables particularly uniform dyestuffs to be produced.

The new chromium-containing azo dyestuffs correspond to the general formula:

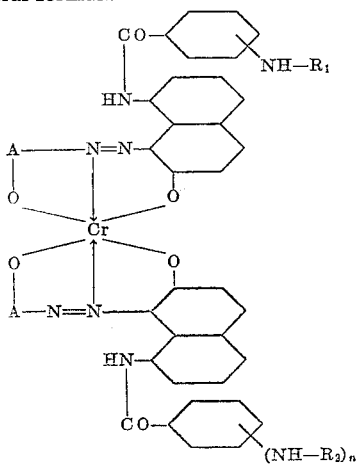

wherein:

A represents a substituted benzene radical containing the metallised group in o-position to the azo group, the substituents being chosen from the class consisting of chlorine atoms, nitro, lower alkyl, cyano and lower alkylcarbonyl groups, $R_1$ and $R_2$ each represents a member selected from the group consisting of alkylsulphonyl, alkoyl and carbalkoxy groups, and $n$ is one of the integers O and 1.

They are used for the purpose of dyeing animal fibers from an aqueous bath advantageously in the form of their ammonium or alkali metal salts, for example as lithium, potassium or sodium salts. If necessary also basic salts as well as anion active wetting and dispersing agents are mixed with them. The new dyestuffs dye materials of animal origin such as wool, silk and leather from a weakly alkaline, neutral to weakly acid bath in olive, green-grey to blue-grey shades. The dyeings are distinguished in particular not only by their excellent fastness to light but also by their good wet fastness properties and evenness. The dyestuffs are also suitable for dyeing and printing other material such as synthetic fibres made from superpolyamides and superpolyurethanes. Some are also suitable for the colouring of lacquers, e.g. those made from nitro or acetyl cellulose.

The following examples illustrate the invention without limiting it in any way. Where not otherwise stated,

EXAMPLE 1

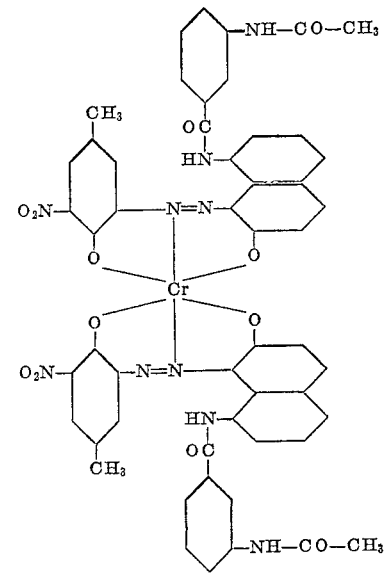

16.8 parts of 6-nitro-4-methyl-2-amino-1-hydroxybenzene in 100 parts of water and 20 parts of concentrated hydrochloric acid are diazotised with a solution of 6.9 parts of sodium nitrite and the diazo mixture is neutralised with sodium bicarbonate. The paste of the diazoxide is poured at 0–3° into a solution of 33.6 parts of N-3'-acetylamino-benzoyl-1-amino-7-hydroxynaphthalene, 60 parts by volume of 2 N-caustic soda lye, 12 parts of sodium carbonate, and 60 parts by volume of pyridine in 250 parts of water. After stirring over night at 0–5°, the mixture is diluted with 1000 parts of 15% sodium chloride solution, heated to 50°, filtered and the residue is washed with about 5000 parts of 5% sodium chloride solution. The dyestuff paste is then pasted in 750 parts of hot water, 150 parts of the sodium salt of disalicylato chromic acid (corresponding to 2.9 parts of chromium), 150 parts by volume of 25% sodium chloride solution and 150 parts by volume of ethylene glycol monomethyl ether are added and the whole is boiled for 24 hours. It is cooled to 30° and the precipitated dyestuff is filtered off and washed with a little cold water. After thoroughly mixing with urea and trisodium phosphate the chromium-containing dyestuff dissolves well in hot water. It dyes wool from a neutral or weakly acid bath in blue-grey shades. The dyeings have very good wet and light fastness properties. Dyestuffs having similar properties are obtained if instead of N-3'-acetylamino-benzoyl-1-amino-7-hydroxynaphthalene, N-2'- or -4'-acetylamino-benzoyl-1-amino-7-hydroxynaphthalene is used.

EXAMPLE 2

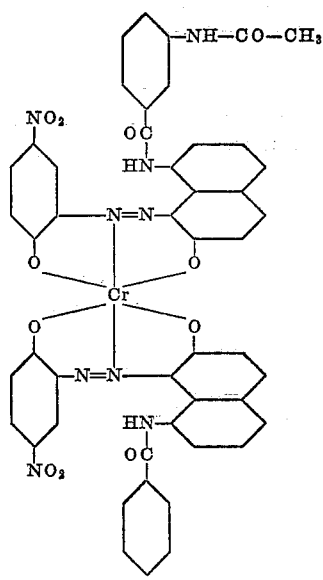

6.15 parts of 4-nitro-2-amino-1-hydroxybenzene in 100 parts of water and 8 parts of concentrated hydrochloric acid are diazotised with a solution of 2.76 parts of sodium nitrite and the diazo mixture is neutralised with sodium bicarbonate. A solution of 5.5 parts of 1-benzoylamino-7-hydroxynaphthalene, 6.7 parts of N-3'-acetylamino-benzoyl-1-amino-7-hydroxynaphthalene, 23 parts by volume of 2 N-caustic soda lye and 4.8 parts of sodium carbonate in 90 parts of water is slowly added dropwise at 0–5°, then 10 parts by volume of pyridine are added and the whole is stirred at 0–5° until the dyestuff formation is complete. The whole is then heated to 60°, 200 parts by volume of 10% sodium chloride solution are added, the dyestuff formed is filtered off and washed with diluted sodium chloride solution. The damp dyestuff is then boiled for 14 hours in 350 parts of water with 65 parts of a solution of the sodium salt of disalicylato chromic acid (corresponding to 1.4 parts of Cr), 100 parts of 10% sodium chloride solution are then added and the product is filtered off hot. The chromium-containing dyestuff, after drying, is a dark powder which dyes wool from a neutral or weakly acid bath in green-olive shades having excellent light fastness and very good fastness to washing and milling.

EXAMPLE 3

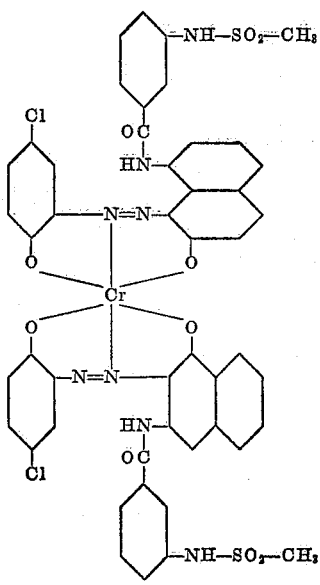

14.4 parts of 4-chloro-2-amino-1-hydroxybenzene are dissolved in 80 parts of hot water and 20 parts of concentrated hydrochloric acid. The compound is cooled to 0° and diazotised with a solution of 6.9 parts of sodium nitrite. After the diazonium solution has been neutralised with sodium bicarbonate, it is poured at 5° into a solution of 37.4 parts of N-3'-methylsulphonylamino-benzoyl-1-amino-7-hydroxynaphthalene, 210 parts by volume of 2 N-caustic soda lye and 12 parts of sodium carbonate in 200 parts of water. The temperature is then raised to room temperature and then the mixture is stirred until the dyestuff formation is complete. It is then warmed to 50°, sodium chloride is added until the dyestuff has completely precipitated, the dyestuff is filtered off warm and washed with 10% sodium chloride solution. The still damp dyestuff is stirred into 500 parts of water, 130 parts of a solution of the sodium salt of disalicylato chromic acid (corresponding to 2.86 parts of Cr) are added and the whole is boiled for 2½ hours. A dark blue solution is formed. It is cooled to 60°, sufficient sodium chloride is added to precipitate the dyestuff and the dyestuff is filtered off. After drying, the dyestuff is a blue-black powder which dyes wool from a weakly acetic acid bath in blue-grey shades which have very good fastness to light and good fastness to washing and milling.

EXAMPLE 4

100 parts of well wetted wool are entered at 50° into a dyebath containing 2 parts of the dyestuff according to Example 2 and 3 parts of ammonium sulphate in 4000 parts of water. The bath is brought to the boil within half an hour and dyeing is performed at this temperature for another hour while moving the goods well. The wool is then rinsed and dried. The wool which has been dyed in full green-olive shades is very evenly penetrated and the fastness properties of the dyeing are good.

Further complex chromium compounds are obtained if the monoazo dyestuffs obtained from the diazo and coupling components given in the following table are chromed according to the methods described in Examples 1 to 3.

Table

| No. | diazo component | coupling component | shade of chromium complex on wool |
|---|---|---|---|
| 1 | 4 - nitro - 2 - amino - 1 - hydroxy-benzene. | N - 2' - acetylamino - benzoyl - 1 - amino - 7 - hydroxynaphthalene. | green-olive. |
| 2 | 6 - chloro - 4 - nitro - 2 - amino - 1 - hydroxy-benzene. | do | olive. |
| 3 | 4 - chloro - 6 - nitro - 2 - amino - 1 - hydroxy-benzene. | N - 3' - acetylamino - benzoyl - 1 - amino - 7 - hydroxynaphthalene. | blue-grey. |
| 4 | 5 - nitro - 2 - amino - 1 - hydroxybenzene. | N - 3' - chloracetylamino - benzoyl - 1 - amino - 7 - hydroxynaphthalene. | greenish-grey. |
| 5 | 4 - nitro - 2 - amino - 1 - hydroxybenzene. | N - 3' - propionylamino - benzoyl - 1 - amino - 7 - hydroxynaphthalene. | green-olive. |
| 6 | do | N - 3' - carbomethoxy - amino - benzoyl - 1 - amino - 7 - hydroxy - naphthalene. | Do. |
| 7 | do | N - 3' - methyl - sulphonylamino - benzoyl - 1 - amino - 7 - hydroxynaphthalene. | Do. |
| 8 | do | N - 3' - ethyl - sylphonylamino - benzoyl - 1 - amino - 7 - hydroxynaphthalene. | Do. |
| 9 | 6 - chloro - 4 - nitro - 2 - amino - 1 - hydroxy - benzene. | N - 3' - methyl - sulphonylamino - benzoyl - 1 - amino - 7 - hydroxynaphthalene. | olive. |
| 10 | 6 - nitro - 2 - amino - 4 - methyl - 1 - hydroxy - benzene. | do | grey. |
| 11 | 6 - nitro - 4 - chloro - 2 - amino - 1 - hydroxy - benzene. | do | Do. |
| 12 | 5 - chloro - 2 - amino - 1 - hydroxybenzene. | do | blue-grey. |
| 13 | 5 - nitro - 2 - amino - 1 - hydroxybenzene. | do | greenish-grey. |
| 14 | 4,6 - dichloro - 2 - amino - 1-hydroxybenzene. | N - 3' - acetylamino - benzoyl - 1 - amino - 7 - hydroxynaphthalene. | grey. |
| 15 | 4 - chloro - 2 - amino - 1 - hydroxybenzene. | N - 3' - chloromethane sulphonylamino-benzoyl - 1 - amino - 7 - hydroxynaphthalene. | blue-grey. |
| 16 | 4 - nitro - 2 - amino - 6 - methyl - 1 - hydroxy - benzene. | do | grey-olive. |
| 17 | 4 - nitro - 2 - amino - 1 - hydroxybenzene. | N - 4' - methyl - sulphonylamino - benzoyl - 1 - amino - 9 - hydroxynaphthalene. | olive green. |
| 18 | do | N - 4' - ethylsulphonylamino - benzoyl - 1 - amino - 7 - hydroxy - naphthalene. | Do. |
| 19 | do | N - 3' - carbethoxylamino - benzoyl - 1 - amino - 7 - hydroxynaphthalene. | green olive. |
| 20 | do | N - 3' - carbomethoxy - ethoxyamino - benzoyl - 1 - amino - 7 - hydroxynaphthalene. | Do. |
| 21 | do | N - 3' - propylsulphonylamino - benzoyl - 1 - amino - 7 - hydroxynaphthalene. | Do. |
| 22 | 6 - nitro - 2 - amino - 4 - isoamyl - 1 - hydroxy - benzene. | N - 3' - methylsulphonyl - amino - benzoyl - 1 - amino - 7 - hydroxynaphthalene. | Do. |
| 23 | 2 - amino - 1 - hydroxy - benzene - 4 - methyl - ketone. | N - 4' - methylsulphonylamino - benzoyl - 1 - amino - 7 - hydroxynaphthalene. | grey. |
| 24 | 4 - cyano - 2 - amino - 1 - hydroxybenzene. | do | Do. |
| 25 | 2 - amino - 1 - hydroxy - benzene - 4 - ethyl - ketone. | N - 4' - acetylamino - benzoyl - 1 - amino - 7 - hydroxynaphthalene. | Do. |
| 26 | 4 - cyano - 2 - amino - 1 - hydroxybenzene. | N - 3' - methylsulphonylamino - benzoyl - 1 - amino - 7 - hydroxynaphthalene. | Do. |

What I claim is:

1. The complex chromium compound corresponding to the general formula

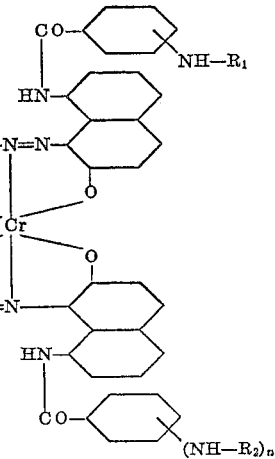

wherein:

A represents a substituted benzene radical, containing the metallised group in o-position to the azo group, the substituents being chosen from the class consisting of chlorine atoms, nitro, lower alkyl, cyano and lower alkylcarbonyl groups $R_1$ and $R_2$ each represents a member selected from group consisting of alkylsulphonyl, alkoyl and carbalkoxy groups and $n$ is one of the integers 0 and 1.

2. The complex chromium compound corresponding to the general formula

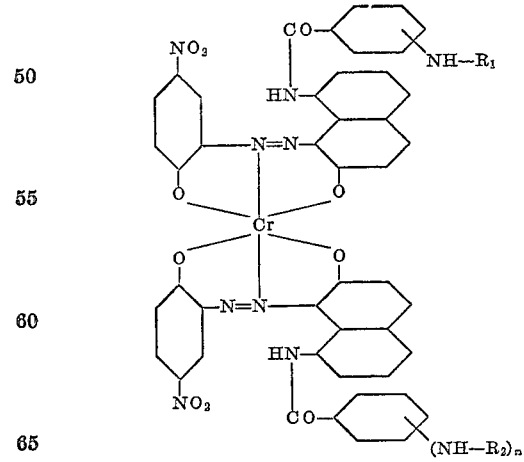

wherein:

$R_1$ and $R_2$ each represents a member selected from group consisting of alkylsulphonyl, alkoyl and carbalkoxy groups and $n$ is one of the integers 0 and 1.

3. The complex chromium compound corresponding to the formula

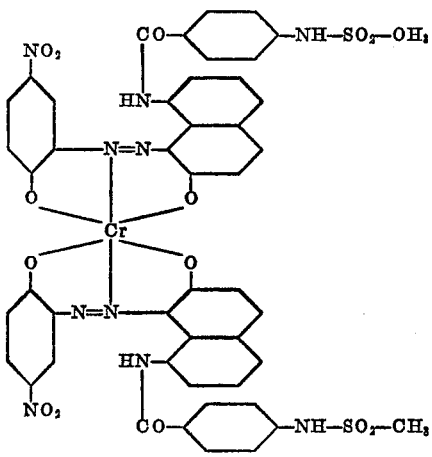

4. The complex chromium compound corresponding to the formula

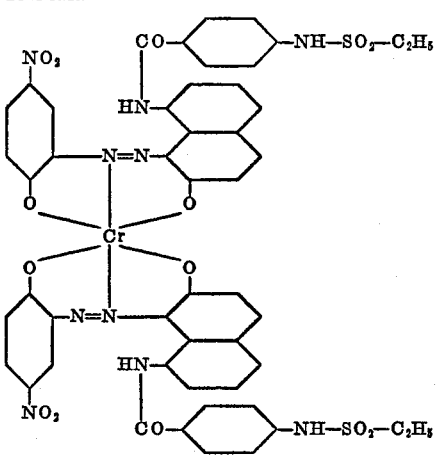

5. The complex chromium compound corresponding to the formula

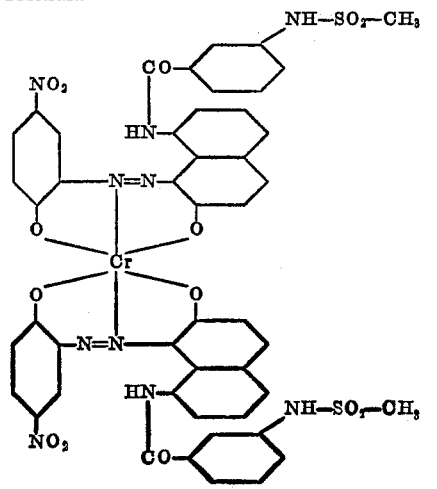

6. The complex chromium compound corresponding to the formula

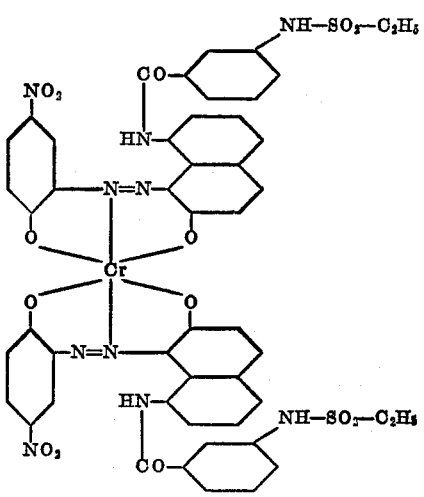

7. The complex chromium compound corresponding to the formula

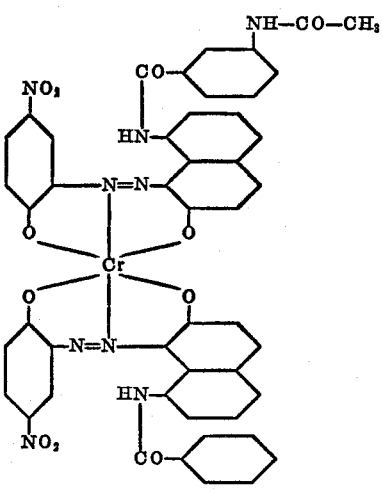

References Cited in the file of this patent
UNITED STATES PATENTS

| | | |
|---|---|---|
| 2,610,175 | Widmer et al. | Sept. 9, 1952 |
| 2,756,223 | Schetty | July 24, 1956 |
| 2,766,230 | Buehler et al. | Oct. 9, 1956 |

FOREIGN PATENTS

| | | |
|---|---|---|
| 755,113 | Great Britain | Aug. 15, 1956 |